United States Patent
Sugahara et al.

(10) Patent No.: US 8,837,939 B2
(45) Date of Patent: Sep. 16, 2014

(54) WAVELENGTH DIVISION MULTIPLEXING TRANSMISSION SYSTEM, OPTICAL CHANNEL MONITOR AND OPTICAL CHANNEL MONITORING METHOD

(75) Inventors: Hiromitsu Sugahara, Tokyo (JP); Takefumi Oguma, Tokyo (JP)

(73) Assignee: NEC Corporation, Tokyo (JP)

( * ) Notice: Subject to any disclaimer, the term of this patent is extended or adjusted under 35 U.S.C. 154(b) by 215 days.

(21) Appl. No.: 13/113,246

(22) Filed: May 23, 2011

(65) Prior Publication Data

US 2011/0286745 A1 Nov. 24, 2011

(30) Foreign Application Priority Data

May 24, 2010 (JP) ................................ 2010-118825

(51) Int. Cl.
 *H04B 10/07* (2013.01)
(52) U.S. Cl.
 USPC ......................................................... 398/34
(58) Field of Classification Search
 USPC ......................................................... 398/34
 See application file for complete search history.

(56) References Cited

U.S. PATENT DOCUMENTS

| 7,149,425 | B2 * | 12/2006 | Gripp et al. ..................... 398/34 |
| 2003/0235145 | A1 * | 12/2003 | Shanbhag et al. ............. 370/201 |
| 2005/0226616 | A1 * | 10/2005 | Davidson ........................ 398/79 |
| 2010/0166423 | A1 * | 7/2010 | Chang et al. ................... 398/65 |

FOREIGN PATENT DOCUMENTS

| JP | 2001044938 A | 2/2001 |
| JP | 2003204302 A | 7/2003 |
| JP | 2004-56700 A | 2/2004 |
| JP | 2010-56676 A | 3/2010 |

OTHER PUBLICATIONS

Japanese Office Action for JP Application No. 2010-118825 mailed on Feb. 18, 2014 with partial English Translation.

* cited by examiner

*Primary Examiner* — Nathan Curs
(74) *Attorney, Agent, or Firm* — Sughrue Mion, PLLC

(57) ABSTRACT

A light channel monitor includes an optical separating section configured to separate a wavelength multiplexed optical signal into optical signals for channels and monitors configured to measure intensities of the optical signals for the channels. A processing section is configured to correct the measured intensities of the optical signals based on a wavelength transmission characteristic of the optical separating section to calculate the wavelength multiplexed optical signal before the separation.

8 Claims, 3 Drawing Sheets

WAVELENGTH DIVISION MULTIPLEXING TRANSMISSION SYSTEM, OPTICAL CHANNEL MONITOR AND OPTICAL CHANNEL MONITORING METHOD

CROSS REFERENCE

This patent application claims a priority on convention based on Japanese Patent Application No. 2010-118825. The disclosure thereof is incorporated herein by reference.

TECHNICAL FIELD

The present invention relates to a wavelength division multiplexing transmission system, and an optical channel monitor used in the system, and a monitoring method.

BACKGROUND ART

A wavelength division multiplexing (WDM) transmission system is known in which a large capacity communication can be performed by multiplexing and transmitting a plurality of optical signals different in wavelength or channel, through a same optical transmission path such as an optical fiber. In the WDM transmission system, the optical signals are transmitted as a wavelength multiplexed optical signal.

Problems are caused of reduction in a signal level of each channel and introduction of noise due to a higher density transmission and a longer transmission distance of the wavelength multiplexed optical signal in relation to an increase in a transmission capacity in recent years. When the signal level (intensity) of the optical signal is reduced or a noise quantity is increased, the optical signal to noise ratio (OSNR) is degraded to reduce transmission quality. In order to prevent the reduction in signal level, an optical repeater is provided on a transmission path to amplify the wavelength multiplexed optical signal. However, when the intensity of the optical signal is excessively strong, the transmission quality is degraded due to the non-linear effect of the optical fiber.

For this reason, in the optical transmission system, the signal level of the optical signal for every channel in the wavelength multiplexed optical signal is monitored by an optical channel monitor, and an optical intensity for every channel is controlled to be constant on the transmission path based on the monitored result. The optical channel monitor is provided with an optical separating unit to separate the wavelength multiplexed optical signal to optical signals for respective wavelengths (for respective channels), and measure the intensity of each of the optical signals and calculate the optical levels (intensities) of the optical signals.

The optical channel monitor is described in Japanese Patent Publication (JP 2003-204302A: Patent Literature 1) and Japanese Patent Publication (JP 2001-44938A: Patent Literature 2). The Patent Literature 1 describes a WDM monitor for determining a correction quantity of a wavelength multiplexed optical signal based on a characteristic of the wavelength multiplexed optical signal and a response characteristic data. Also, the Patent Literature 2 describes a monitor which monitors the number of optical signals, in which a wavelength interval between ports is a half of a wavelength interval (channel interval) between the optical signals in the wavelength multiplexed optical signal.

CITATION LIST

[Patent Literature 1]: JP 2003-204302A
[Patent Literature 2]: JP 2001-44938A

SUMMARY OF THE INVENTION

An optical separating unit in an optical channel monitor separates a wavelength multiplexed optical signal $A0_0$ into optical signals for wavelengths (channels). For example, when the wavelength multiplexed optical signal $A0_0$ is generated by multiplexing optical signals $A0_1$ to $A0_x$ for 1 to X channels, the wavelengths of optical signals $A1_1$ to $A1_x$ separated by the ideal optical separating unit should be coincident with the wavelengths of the optical signals $A0_1$ to $A0_x$ before the separation. That is, ideally, when the optical signals $A1_1$ to $A1_x$ after the separation are multiplexed, the signal coincident with the wavelength multiplexed optical signal $A0_0$ before the separation is expected to be generated. However, since an actual optical separating unit has a wavelength transmission characteristic, the optical signal for each channel has a crosstalk with another channel. For this reason, each of the optical signals $A1_1$ to $A1_x$ after the separation includes an optical signal component which is different from a corresponding wavelength component of the wavelength multiplexed optical signal $A0_0$.

For example, the optical signal $A0_n$ before the separation and the optical signal $A1_n$ after the separation are desired to be same. However, actually, the optical signal $A1_n$ after the separation includes an optical signal component corresponding to the optical signals $A0_1$ to $A0_{1-n}$ and $A0_{n-1}$ to $A0_x$.

In the conventional optical channel monitor, the intensities of the optical signals $A1_1$ to $A1_x$ are measured under the assumption that there is not a crosstalk with the other channels caused by the wavelength transmission characteristic. In actual, however, there is a difference between the ideal optical level and the actual optical level. Thus, this difference hinders an accurate control of the wavelength division multiplexing transmission system.

Therefore, a subject matter of the present invention is to provide an optical channel monitor and an optical channel monitoring method, in which an intensity of a wavelength division multiplexing optical signal can be measured for each channel in a high precision, and a wavelength division multiplexing transmission system using the optical channel monitor, and a wavelength division multiplexing transmission method using the optical channel monitoring method.

In an aspect of the present invention, A light channel monitor includes: an optical separating section configured to separate a wavelength multiplexed optical signal into optical signals for channels; monitors configured to measure intensities of the optical signals for the channels; and a processing section configured to correct the measured intensities of the optical signals based on a wavelength transmission characteristic of the optical separating section to calculate the wavelength multiplexed optical signal before the separation.

In another aspect of the present invention, a wavelength multiple multiplexing transmission system includes: the above light channel monitor; and a control unit configured to correct the intensity of the wavelength multiple optical signal based on control target values calculated from a difference between the intensity, calculated by the light channel monitor, of the optical signal before the separation and a desired intensity of the optical signal.

In still another aspect of the present invention, a light channel monitoring method is achieved by separating a wavelength multiplexed optical signal into optical signals for channels by an optical separating section; by measuring intensities of the optical signals for the channels; and by calculating the wavelength multiplexed optical signal before the separation by correcting the measured intensities based on a wavelength penetration characteristic of the optical separating section.

In still another aspect of the present invention, a wavelength multiple transmitting method is achieved by the above light channel monitoring method; and by correcting the intensity of the wavelength multiplexed optical signal based on control target values indicated by a difference between the intensity of the wavelength multiplexed optical signal before the separation and a desired intensity of the wavelength multiplexed optical signal.

From the above description, according to the present invention, it is possible to improve the measurement precision of an optical intensity for each channel in the wavelength division multiplexing optical signal.

Also, it is possible to improve data transmission ability in the wavelength division multiplexing transmission system.

BRIEF DESCRIPTION OF THE DRAWINGS

The above and other objects, advantages and features of the present invention will be more apparent from the following description of certain embodiments taken in conjunction with the accompanying drawings, in which.

Figure 1:
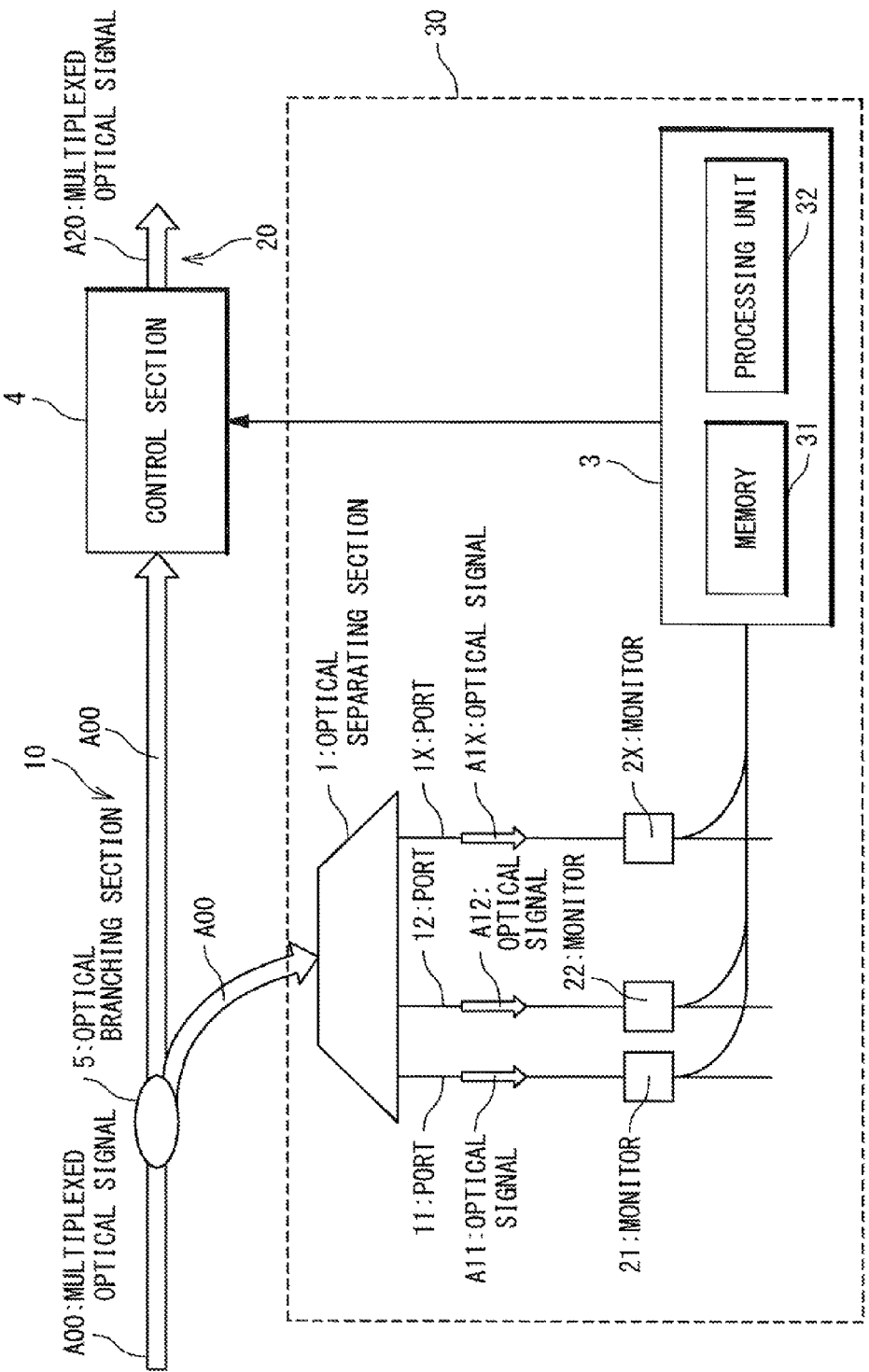
FIG. 1 is a block diagram showing a configuration of a wavelength division multiplexing transmission system according to an embodiment of the present invention.

DESCRIPTION OF EXEMPLARY
EMBODIMENTS

Hereinafter, a wavelength division multiplexing transmission system of the present invention will be described below with reference to the attached drawings. In the drawings, the same or similar reference symbols denote the same or similar components.
(Configuration)

One example of the configuration of the wavelength division multiplexing transmission system according to the present invention will be described below with reference to FIG. 1. The wavelength division multiplexing transmission system is provided with optical transmission paths 10 and 20, an optical channel monitor 30, a control section 4, and an optical branching section 5.

The optical transmission paths 10 and 20 are exemplified by optical fiber cables and transmit a wavelength division multiplexing optical signal after wavelength division multiplexing by an optical combining circuit (not shown). Usually, a relay unit (optical amplifier) for amplifying the wavelength division multiplexing optical signal and/or an optical add/drop multiplexing (OADM) unit for adding/dropping an optical signal of a predetermined wavelength to/from the wavelength division multiplexing optical signal are provided on the optical transmission paths 10 and 20, although they are not shown. Hereinafter, the wavelength division multiplexing optical signal is also referred to as a wavelength multiplexed optical signal in this specification and claims.

Figure 2:
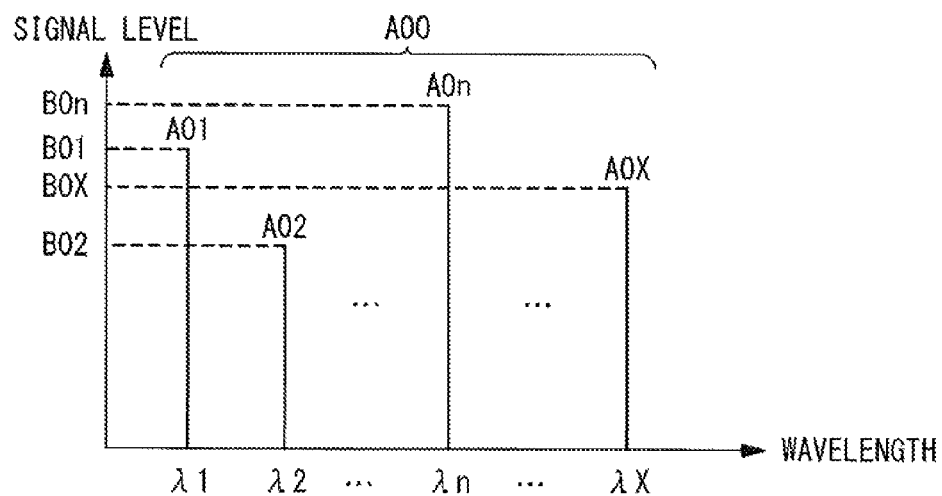
FIG. 2 is a diagram showing one example of a wavelength-intensity characteristic in a wavelength multiplexed optical signal according to the present invention.

In this embodiment, a wavelength multiplexed optical signal $A0_0$, which is generated by multiplexing a plurality of optical signals $A_{01}$ to $A0_x$ of wavelengths $\bullet_1$ to $\bullet_x$, is transmitted onto the optical transmission path 10. That is, the wavelength multiplexed optical signal $A0_0$ includes the plurality of optical signals $A0_1$ to $A0_x$ of the different wavelengths $\bullet_1$ to $\bullet_x$ as shown in FIG. 2. Here, it is supposed that respective optical levels of the optical signals $A0_1$ to $A0_x$ are intensities $B0_1$ to $B0_x$. Hereinafter, the wavelengths $\bullet_1$ to $\bullet_x$ are referred to as channels, and they are distinguished from each other.

The optical branching section 5 is provided with an optical filter, an optical coupler or an optical splitter, and branches the wavelength multiplexed optical signal $A_{00}$ transmitted on the transmission path 10. The branching resultant wavelength multiplexed optical signals $A0_0$ are supplied to the control section 4 and the optical channel monitor 30.

The optical channel monitor 30 is provided with an optical separating section 1, monitors $2_1$ to $2_x$ and a correction processing section 3. As the optical separating section 1, a polychromator type spectroscope, an array waveguide grating (AWG) type spectroscope, a fiber grating type spectroscope, a tunable filter type spectroscope and the like are usable. The optical separating section 1 separates the wavelength multiplexed optical signal $A_{00}$ obtained through the branching by the optical branching section 5 into optical signals $A1_1$ to $A1_x$ for channels and outputs the optical signals $A1_1$ to $A1_x$ from ports $1_1$ to $1_x$. Here, the optical signals $A1_1$ to $A1_x$ are obtained for channels corresponding to the wavelengths $\bullet_1$ to $\bullet_x$, and outputted from the ports $1_1$ to $1_x$, respectively.

The monitors $2_1$ to $2_x$ are connected to the ports $1_1$ to $1_x$ and measure the optical intensities of the optical signals $A1_1$ to $A1_x$ for the channels (also, to be referred to as optical signal levels or optical powers), respectively. As the monitors $2_1$ to $2_x$, photo diodes (PD), avalanche photo diodes (APD) and the like are preferably used, and they convert the optical signals $A1_1$ to $A1_x$ into electrical signals with voltage levels corresponding to optical intensities $B1_1$ to $B1_x$ of the optical signals $A1_1$ to $A1_x$. The optical intensities $B1_1$ to $B1_x$ measured by the monitors $2_1$ to $2_x$ are supplied to the correction processing section 3 as the electrical signals.

The correction processing section 3 is a computer for collecting, storing and calculating the optical intensities $B1_1$ to $B1_x$ measured by the monitors $2_1$ to $2_x$. In detail, the correction processing section 3 contains a storage unit (memory) 31 for storing data indicating the optical intensities $B1_1$ to $B1_x$ and a processing unit 32 for calculating control target values based on the collected optical intensities $B1_1$ to $B1_x$ and determining an optical intensity control quantity in the control section 4 based on the control target values.

Optical intensities $B2_1$ to $B2_x$ as the respective target values for the channels are preset in the memory 31. Also, a filter characteristic (a wavelength transmission characteristic) of the optical separating section 1 for the ports $1_1$ to $1_x$ is set in the memory 31. The processing unit 32 corrects the measured optical intensities $B1_1$ to $B1_x$ in consideration of the respective filter characteristic (wavelength transmission characteristic) for the ports $1_1$ to $1_x$, and calculates optical intensities $B0_1$ to $B0_x$ of the optical signals $A0_1$ to $A0_x$ before the separation. The processing unit 32 calculates differences between the calculated optical intensities $B0_1$ to $B0_x$ and the preset optical intensities $B2_1$ to $B2_x$ as control target values.

The control section 4 is provided between the optical transmission path 10 and the optical transmission path 20 and corrects the optical intensity of the wavelength multiplexed optical signal $A0_0$ transmitted through the optical transmission path 10 and outputs the wavelength multiplexed optical signal $A2_0$ onto the optical transmission path 20. The control section 4 includes an optical amplifier such as EDFA (Erbium Doped Fiber Amplifier) and SOA (Semiconductor Optical Amplifier), liquid crystal, an optical attenuator exemplified by a MEMS, an optical branching unit such as a wavelength switch. The control section 4 carries out amplification, attenuation, branching and the like of the wavelength multiplexed optical signal $A0_0$ and amplifies or attenuates the optical signals $A0_1$ to $A0_x$ based on the control target values specified for the channels by the correction processing section 3.

By the above configuration, in the wavelength division multiplexing transmission system according to the present invention, the intensities of the optical signals for the respective channels before the separation are calculated in consideration of the wavelength transmission characteristic of the optical separating section 1, and the intensity of the wavelength multiplexed optical signal $A0_0$ is corrected on the basis of the calculated intensities. Thus, the intensity correction is achieved in a high precision.

(Optical Channel Monitoring Method and Intensity Correcting Method)

Figure 3:
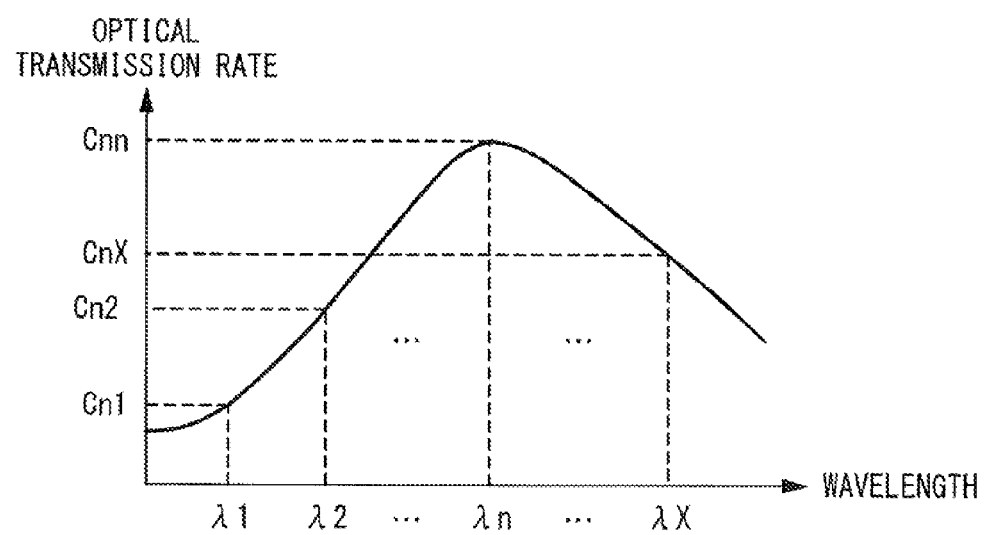
FIG. 3 is a diagram showing one example of a wavelength transmission characteristic in a port of an optical separating unit according to the present invention.
Figure 4:
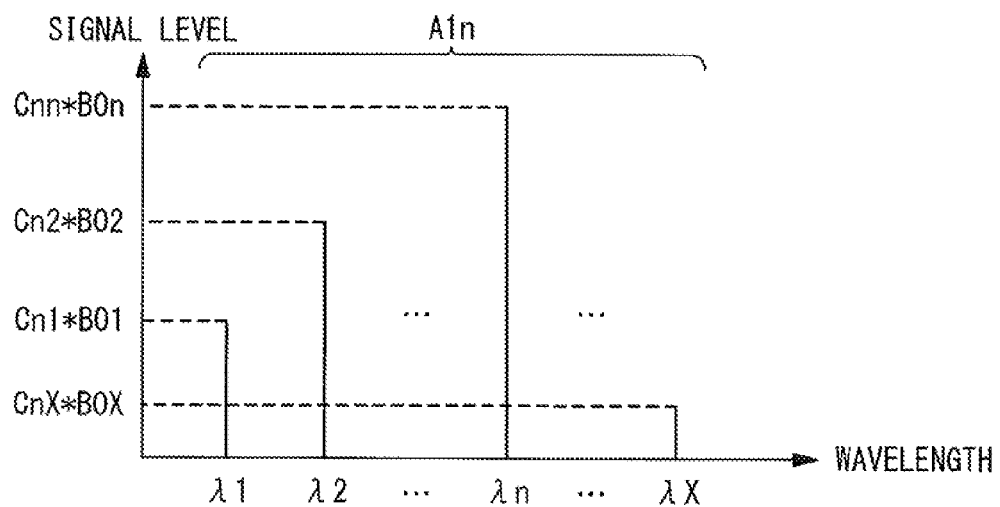
FIG. 4 is a diagram showing one example of a wavelength-intensity characteristic of an optical signal after separation in an optical channel monitor according to the present invention.
Figure 5:
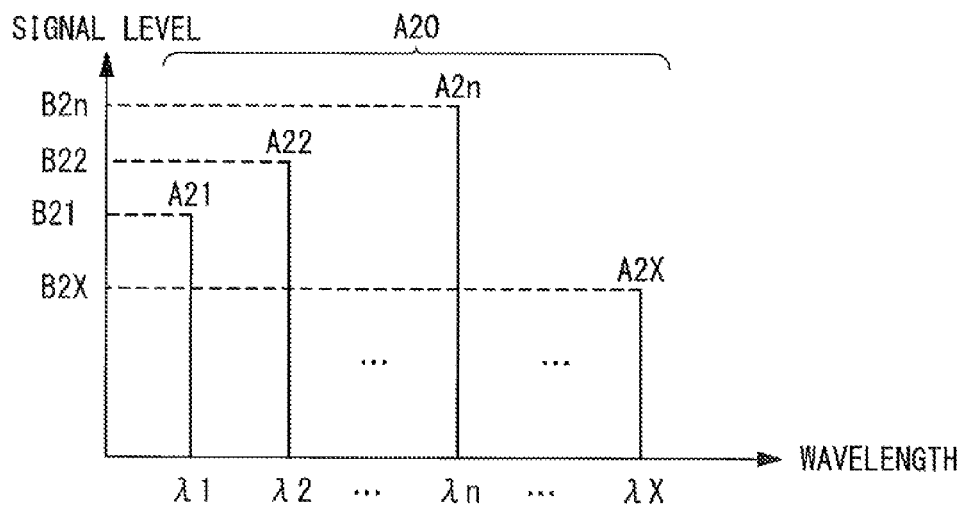
FIG. 5 is a diagram showing one example of a wavelength-intensity characteristic of the wavelength multiplexed optical signal after intensity correction in the present invention.

The details of the optical channel monitoring method and the intensity correcting method according to the present invention will be described below with reference to FIGS. 3 to 5.

In the optical separating section 1, a peculiar wavelength transmission characteristic is given for the ports $1_1$ to $1_x$. FIG. 3 is a graph showing one example of the wavelength transmission characteristic of the port $1_n$ in the optical separating section 1 according to the present invention. With reference to FIG. 3, in the wavelength transmission characteristic for the port $1_n$, a transmission rate $Cn_n$ of the optical signal $A0_n$ for the wavelength $\bullet_n$ is the highest and the transmission rates $Cn1$ to $Cn_{n-1}$ and $Cn_{n+1}$ to $Cn_x$ of the optical signals for the other wavelengths $\bullet 1$ to $\bullet_{n-1}$, and $\bullet_{n+1}$ to $\bullet_x$ are lower than the transmission rate $Cn_n$. Here, in the port $1_n$, the transmission rate of the optical signal $A0_x$ for the wavelength $\bullet_x$ is defined as $Cn_x$.

Ideally, the monitor $2_n$ detects the optical intensity $B0_n$ of the optical signal $A0_n$ before the separation, as the optical intensity $B1_n$ of the optical signal $A1_n$. However, as mentioned above, the optical separating section 1 has the wavelength transmission characteristic for each port (for each channel). Thus, actually, the optical intensity $B1_n$ is detected which is different from the optical intensity $B0_n$ before the separation. For example, as shown in FIG. 4, the optical signal $A1_n$ for the $n^{th}$ channel (for the wavelength $\bullet_n$) separated from the wavelength multiplexed optical signal $A0_0$ mainly includes the optical signal of the wavelength $\bullet_n$. However, the optical signals for the other wavelengths $\bullet_1$ to $\bullet_{n-1}$, and $\bullet_{n+1}$ to $\bullet_x$ are also included based on the transmission rates, respectively. With reference to FIG. 4, in the port $1_n$, when in the transmission rates of the optical signals for the wavelengths $\bullet_1$ to $\bullet_x$ are defined as $Cn_1$ to $Cn_x$, the intensities of the optical signals of the wavelengths $\bullet_1$ to $\bullet_x$ included in the optical signal $A1_n$ after the separation become $Cn_1*B0_1$ to $Cn_x*B0_x$. In this case, the intensity $B1_n$ of the optical signal $A1_n$ detected by the monitor $2_n$ is represented by the following equation (1):

$$B1_n = Cn_1 \times B0_1 + Cn_2 \times B0_2 + \ldots + Cn_n \times B0_n + \ldots + Cn_x \times B0_x \quad (1)$$

The other optical signals $A1_1$ to $A1_{n-1}$ and $A1_{n+1}$ to $A1_x$ separated by the optical separating section 1 are also similar. Thus, the intensities $B1_1$ to $B1_x$ of the optical signals $A1_1$ to $A1_x$ detected by the monitors $2_1$ to $2_x$ are represented by the following equation (2).

$$\begin{pmatrix} B1_1 \\ B1_2 \\ \vdots \\ B1_n^* \\ \vdots \\ B1_X \end{pmatrix} = \begin{pmatrix} C1_1 & C1_2 & \ldots & C1_n & \ldots & C1_X \\ C2_1 & C2_2 & \ldots & C2_n & \ldots & C2_X \\ \vdots & \vdots & \vdots & \vdots & \vdots & \vdots \\ Cn_1 & Cn_2 & \ldots & Cn_n & \ldots & Cn_X \\ \vdots & \vdots & \vdots & \vdots & \vdots & \vdots \\ CX_1 & CX_2 & \ldots & CX_n & \ldots & CX_X \end{pmatrix} \begin{pmatrix} B0_1 \\ B0_2 \\ \vdots \\ B0_n \\ \vdots \\ B0_X \end{pmatrix} \quad (2)$$

It should be noted that a matrix C represented by the following equation (3) indicates the wavelength transmission characteristic of the optical separating section 1 for all of the channels (all of the ports):

$$C = \begin{pmatrix} C1_1 & C1_2 & \ldots & C1_n & \ldots & C1_X \\ C2_1 & C2_2 & \ldots & C2_n & \ldots & C2_X \\ \vdots & \vdots & \vdots & \vdots & \vdots & \vdots \\ Cn_1 & Cn_2 & \ldots & Cn_n & \ldots & Cn_X \\ \vdots & \vdots & \vdots & \vdots & \vdots & \vdots \\ CX_1 & CX_2 & \ldots & CX_n & \ldots & CX_X \end{pmatrix} \quad (3)$$

The processing unit 32 uses an inverse matrix $C^{-1}$ of the matrix C represented by the equation (3) and the intensities $B1_1$ to $B1_x$ detected by the monitors $2_1$ to $2_x$ and calculates the optical intensities for the channels in the wavelength-wavelength multiplexed optical signal $A0_0$ (the optical intensities $B0_1$ to $B0_x$ of the optical signals $A0_1$ to $A0_x$) before the separation.

$$\begin{pmatrix} B0_1 \\ B0_2 \\ \vdots \\ B0_n \\ \vdots \\ B0_X \end{pmatrix} = C^{-1} \begin{pmatrix} B1_1 \\ B1_2 \\ \vdots \\ B1_n \\ \vdots \\ B1_X \end{pmatrix} \quad (4)$$

The processing unit 32 determines the control target values as the correction values for the channels of the wavelength multiplexed optical signal $A0_0$ based on the differences between the calculated optical intensities $B0_1$ to $B0_x$ and the optical intensities $B2_1$ to $B2_x$ as target intensities.

The control section 4 corrects the optical intensity of the wavelength multiplexed optical signal $A0_0$ for each channel on the basis of a correction value determined from the control target values calculated by the correction processing section 3. For example, the control section 4 corrects the wavelength multiplexed optical signal $A0_0$ shown in FIG. 2, and generates the wavelength multiplexed optical signal $A2_0$ shown in FIG. 5 to output to the optical transmission path 20. Here, the optical intensities $B0_1$ to $B0_x$ of the wavelength multiplexed optical signal $A0_0$ for the channels (the optical signals $A0_1$ to $A0_x$) are corrected (or compensated) to the target intensities (the intensities $B2_1$ to $B2_x$) shown in FIG. 5.

In the wavelength division multiplexing transmission system, in order to improve the optical transmission characteristic, it is necessary to accurately know the respective optical signal levels of the plurality of optical signals included in the wavelength multiplexed optical signal and then perform the controls such as the amplification, the separation and the like to be values optimal for the optical signals.

For this purpose, the wavelength multiplexed optical signal is separated for each wavelength into the plurality of optical signals by the optical separating section 1, and the signal levels of the plurality of optical signals are measured by the monitors 2, thereby calculating the signal levels of the plurality of optical signals included in the wavelength multiplexed optical signal.

Ideally, the optical signal $A0_0$ is expected to be separated into the optical signals $A0_1$ to $A0_x$ by the optical separating section 1. However, actually, because of the influence of the wavelength transmission characteristic of the optical separating section 1, it is separated into the optical signals $A1_1$ to $A1_x$, each of which includes all of the wavelengths of the optical signals $A0_1$ to $A0_x$ as crosstalk.

As an example, the optical signal $A1_n$ is desired to include only the optical signal having the same wavelength as the optical signal $A0_n$. However, actually, the optical signal $A1_n$ includes the other wavelength components, i.e. the optical signals $A0_1$ to $A0_{1-n}$, and $A0_{n+1}$ to $A0_x$ at the same time.

However, conventionally, the transmission rates causing crosstalk, of the wavelength transmission characteristic other than the transmission rate $Cn_n$ were assumed to be 0, and the optical intensity was considered to be $B1_n = Cn_n * B0_n'$. In this case, the signal level of the optical signal $A0_n$ before the separation is calculated as an approximate value $B0_n'$ of the intensity $B0_n$, i.e. $B0_n' = (1/Cn_n) * B1_n$. However, this value contains an error from the actual optical intensity $B0_n$. Also, the control target value given to the control section 4 becomes an erroneous value.

In the present invention, the optical intensities $B0_1$ to $B0_x$ of the optical signals $A0_1$ to $A0_x$ before the separation are calculated in consideration of the optical transmission characteristic of the optical separating section 1, and these intensities $B0_1$ to $B0_x$ are used to determine the control target values. Thus, the intensity of the wavelength multiplexed optical signal $A0_0$ can be corrected for each channel based on the ideal optical intensities $B0_1$ to $B0_x$ before the separation, and the accurate control target values can be calculated.

Also, in the present invention, when the optical signal $A1_n$ for the $n^{th}$ channel after the separation is to be corrected, the optical intensities $B1_1$ to $B1_x$ of the optical signals $A1_1$ to $A1_x$ outputted from all of the ports $1_1$ to $1_x$ after the separation and the transmission rates $Cn_1$ to $Cn_x$ of the wavelength transmission characteristic for the port $1_n$ are used to calculate the optical intensity $B0_n$ before the separation. In this way, in the present invention, because the influence of crosstalk between the channels is considered, the optical intensities $B0_1$ to $B0_x$ of the optical signals $A0_1$ to $A0_x$ before the separation can be reproduced at the high precision, and the accurate control target values can be calculated, even when a high density communication is carried out in a narrow channel distance.

As mentioned above, according to the present invention, the optical intensities $B0_1$ to $B0_x$ can be calculated in a high precision, and the accurate control target values can be calculated, resulting in being able to transmit a desirable wavelength multiplexed optical signal $A2_0$. That is, according to the present invention, data transmission accuracy (optical transmission characteristic) can be improved.

As mentioned above, the embodiments of the present invention have been described. However, a specific configuration is not limited to the above-mentioned embodiments. Even a modification in a range without departing from the scope of the present invention is included in the present invention. In these embodiments, the control section 4 is provided between the optical transmission path 10 and the optical transmission path 20. However, it is not limited to the above example. It may be provided before the optical branching section 5 or before or after the monitors $2_1$ to $2_x$. Also, in these embodiments, the wavelength multiplexed optical signal $A0_0$ is branched into the optical separating section 1 and the control section 4 by the optical branching section 5. However, the wavelength multiplexed optical signal $A0_0$ may be directly supplied to the optical separating section 1. In this case, the control section 4 is inserted before the optical branching section 5 or before or after the monitors $2_1$ to $2_x$.

Also, in these embodiments, the intensities $B1_1$ to $B1_x$ of the optical signals $A1_1$ to $A1_x$ for the wavelengths $•_1$ to $•_x$ (the channels), which are included in the wavelength multiplexed optical signal $A0_0$ and the wavelength transmission characteristic are used to calculate the intensities $B0_1$ to $B0_x$ of the optical signals $A0_1$ to $A0_x$ before the separation and the control target values for correcting the intensity of the wavelength multiplexed optical signal $A0_0$. However, the present invention is not limited to the above example. For example, for each channel (for each port), the intensity of spectroscopic wave in a predetermined wavelength range having a wavelength (peak wavelength) corresponding to the channel as a center wavelength and the wavelength transmission characteristic may be used to calculate the optical intensities $B0_1$ to $B0_x$ before the separation and the control target values.

What is claimed is:

1. A light channel monitor comprising:
an optical separating section configured to separate a first wavelength multiplexed optical signal into optical signals for channels;
monitors configured to measure intensities of the optical signals for the channels; and
a processing section configured to correct the measured intensities of the optical signals based on a wavelength transmission characteristic of said optical separating section to calculate the intensity which the wavelength multiplexed optical signal before the separation had,
wherein said measured intensities corrected by said processing section is used to correct an intensity of a second wavelength multiplexed optical signal, and
wherein said first wavelength multiplexed optical signal and said second wavelength multiplexed optical signal are branched from a same original wavelength multiplexed optical signal.

2. The light channel monitor according to claim 1, wherein said optical separating section separates the wavelength multiplexed optical signal into a plurality of optical signals numbered from first to X to output an $n^{th}$ one among the plurality of optical signals from a $n^{th}$ port for each value of n between 1 and X, wherein X is a total number of channels and ports,
wherein said processing unit uses: a set of transmission rates $Cn_1$ to $Cn_X$, partially extracted from a transmission rate matrix C including transmission rate $C1_1$ to $CX_X$ representing wavelength transmission characteristics of the $n^{th}$ optical signal including wavelengths $\lambda_1$ to $\lambda_X$ respectively outputted from said $n^{th}$ port; and a set of intensities $B1_1$ to $B1_X$ of the plurality of optical signals respectively outputted from first to $X^{th}$ ports as the ports and detected by said monitors, to calculate an intensity $B0_n$ of the optical signal in $n^{th}$ channel before separation,
wherein the intensity $B1_n$ in $n^{th}$ channel is shown by the following equation (1), the transmission rate matrix C is shown by the following equation (2) and the intensities $B0_1$ to $B0_X$ are shown by the following equation (3):

$$B1_n = Cn_1 \times B0_1 + Cn_2 \times B0_2 + \ldots + Cn_n \times B0_n + \ldots + Cn_X \times B0_X \qquad (1)$$

$$C = \begin{pmatrix} C1_1 & C1_2 & \ldots & C1_n & \ldots & C1_X \\ C2_1 & C2_2 & \ldots & C2_n & \ldots & C2_X \\ \vdots & \vdots & \vdots & \vdots & \vdots & \vdots \\ Cn_1 & Cn_2 & \ldots & Cn_n & \ldots & Cn_X \\ \vdots & \vdots & \vdots & \vdots & \vdots & \vdots \\ CX_1 & CX_2 & \ldots & CX_n & \ldots & CX_X \end{pmatrix} \quad (2)$$

$$\begin{pmatrix} B0_1 \\ B0_2 \\ \vdots \\ B0_n \\ \vdots \\ B0_X \end{pmatrix} = C^{-1} \begin{pmatrix} B1_1 \\ B1_2 \\ \vdots \\ B1_n \\ \vdots \\ B1_X \end{pmatrix}. \quad (3)$$

3. A wavelength multiple multiplexing transmission system comprising:

a light channel monitor which comprises:

an optical separating section configured to separate a wavelength multiplexed optical signal into optical signals for channels, monitors configured to measure intensities of the optical signals for the channels, and a processing section configured to correct the measured intensities of the optical signals based on a wavelength transmission characteristic of said optical separating section to calculate the intensity which the wavelength multiplexed optical signal before the separation had; and a control unit configured to correct the intensity of the wavelength multiplexed optical signal based on control target values calculated from a difference between the intensity, calculated by said light channel monitor, of the optical signal before the separation and a target intensity of the optical signal.

4. The wavelength multiple multiplexing transmission system according to claim 3, wherein said optical separating section separates the wavelength multiplexed optical signal to output the optical signal of the $n^{th}$ channel from a $n^{th}$ port for each value of n between 1 and X, wherein X is a total number of channels and ports, as the channels from an $n^{th}$ one of n ports, wherein said processing unit uses: a set of transmission rates $Cn_1$ to $Cn_X$, partially extracted from a transmission rate matrix C including transmission rate $C1_1$ to $CX_X$ representing wavelength transmission characteristics of the $n^{th}$ optical signal including wavelengths $\lambda_1$ to $\lambda_X$ respectively outputted from said $n^{th}$ port; and a set of intensities $B1_1$ to $B1_X$ of the plurality of optical signals respectively outputted from first to $X^{th}$ ports as the ports and detected by said monitors, to calculate an intensity $B0_n$ of the optical signal in $n^{th}$ channel before separation, wherein the intensity $B1_n$ in $n^{th}$ channel is shown by the following equation (1), the transmission rate matrix C is shown by the following equation (2) and the intensities $B0_1$ to $B0_X$ are shown by the following equation (3):

$$B1_n = Cn_1 \times B0_1 + Cn_2 \times B0_2 + \ldots + Cn_n \times B0_n + \ldots + Cn_X \times B0_X \quad (1)$$

$$C = \begin{pmatrix} C1_1 & C1_2 & \ldots & C1_n & \ldots & C1_X \\ C2_1 & C2_2 & \ldots & C2_n & \ldots & C2_X \\ \vdots & \vdots & \vdots & \vdots & \vdots & \vdots \\ Cn_1 & Cn_2 & \ldots & Cn_n & \ldots & Cn_X \\ \vdots & \vdots & \vdots & \vdots & \vdots & \vdots \\ CX_1 & CX_2 & \ldots & CX_n & \ldots & CX_X \end{pmatrix} \quad (2)$$

$$\begin{pmatrix} B0_1 \\ B0_2 \\ \vdots \\ B0_n \\ \vdots \\ B0_X \end{pmatrix} = C^{-1} \begin{pmatrix} B1_1 \\ B1_2 \\ \vdots \\ B1_n \\ \vdots \\ B1_X \end{pmatrix}. \quad (3)$$

5. A light channel monitoring method comprising:

separating a first wavelength multiplexed optical signal into optical signals for channels by an optical separating section;

measuring intensities of the optical signals for the channels; and calculating the intensity which the wavelength multiplexed optical signal before the separation had by correcting the measured intensities based on a wavelength penetration characteristic of said optical separating section, wherein said measured intensities corrected by said processing section is used to correct an intensity of a second wavelength multiplexed optical signal, and wherein said first wavelength multiplexed optical signal and said second wavelength multiplexed optical signal are branched from a same original wavelength multiplexed optical signal.

6. The light channel monitoring method according to claim 5, wherein said separating comprises:

outputting an $n^{th}$ one among a plurality of optical signals numbered from first to X from an $n^{th}$ port for each value of n between 1 and X, wherein X is a total number of channels and ports, wherein said calculating comprises:

calculating an intensity $B0_n$ of the optical signal in $n^{th}$ channel before separation by using: a set of transmission rates $Cn_1$ to $Cn_X$, partially extracted from a transmission rate matrix C including transmission rates $C1_1$ to $CX_X$, representing wavelength transmission characteristic of the $n^{th}$ optical signal including wavelengths $\lambda_1$ to $\lambda_X$ respectively outputted from said $n^{th}$ port; and a set of intensities $B1_1$ to $B1_X$ of the plurality of optical signals respectively outputted from the first to $X^{th}$ ports, wherein said separating further comprises:

wherein the intensity $B1_n$ in $n^{th}$ channel is shown by the following equation (4), the transmission matrix C is shown by the following equation (2), and the intensities $B0_1$ to $B0_X$ are shown by the following equation (3):

$$C = \begin{pmatrix} C1_1 & C1_2 & \ldots & C1_n & \ldots & C1_X \\ C2_1 & C2_2 & \ldots & C2_n & \ldots & C2_X \\ \vdots & \vdots & \vdots & \vdots & \vdots & \vdots \\ Cn_1 & Cn_2 & \ldots & Cn_n & \ldots & Cn_X \\ \vdots & \vdots & \vdots & \vdots & \vdots & \vdots \\ CX_1 & CX_2 & \ldots & CX_n & \ldots & CX_X \end{pmatrix} \quad (2)$$

-continued $$\begin{pmatrix} B0_1 \\ B0_2 \\ \vdots \\ B0_n \\ \vdots \\ B0_X \end{pmatrix} = C^{-1} \begin{pmatrix} B1_1 \\ B1_2 \\ \vdots \\ B1_n \\ \vdots \\ B1_X \end{pmatrix} \quad (3)$$

$$B1_n = Cn_1 \times B0_1 + Cn_2 \times B0_2 + \ldots + Cn_n \times B0_n + \ldots + Cn_X \times B0_X \quad (4)$$

7. A wavelength multiple transmitting method comprising:
a light channel monitoring method which comprises:
  separating a wavelength multiplexed optical signal into optical signals for channels by an optical separating section;
  measuring intensities of the optical signals for the channels; and
  calculating the intensity which the wavelength multiplexed optical signal before the separation had by correcting the measured intensities based on a wavelength penetration characteristic of said optical separating section; and
correcting the intensity of the wavelength multiplexed optical signal based on control target values indicated by a difference between the intensity of the wavelength multiplexed optical signal before the separation and a target intensity of the wavelength multiplexed optical signal.

8. The light channel monitoring method according to claim 7, wherein said separating comprises:
  outputting an $n^{th}$ one among a plurality of optical signals numbered from first to X from an $n^{th}$ port for each value of n between 1 and X, wherein X is a total number of channels and ports, wherein said calculating comprises:
  calculating an intensity $B0_n$ of the optical signal in $n^{th}$ channel before separation by using: a set of transmission rates $Cn_1$ to $Cn_X$, partially extracted from a transmission rate matrix C including transmission rates $C1_1$ to $CX_X$, representing wavelength transmission characteristic of the $n^{th}$ optical signal including wavelengths $\lambda_1$ to $\lambda_X$ outputted respectively from said $n^{th}$ port; and a set of intensities $B1_1$ to $B1_X$ of the plurality of optical signals respectively outputted from the first to $X^{th}$ ports, wherein said separating further comprises:
wherein the intensity $B1_n$ in $n^{th}$ channel is shown by the following equation (4), the transmission matrix C is shown by the following equation (2), and the intensities $B0_1$ to $B0_X$ are shown by the following equation (3):

$$C = \begin{pmatrix} C1_1 & C1_2 & \ldots & C1_n & \ldots & C1_X \\ C2_1 & C2_2 & \ldots & C2_n & \ldots & C2_X \\ \vdots & \vdots & \vdots & \vdots & \vdots & \vdots \\ Cn_1 & Cn_2 & \ldots & Cn_n & \ldots & Cn_X \\ \vdots & \vdots & \vdots & \vdots & \vdots & \vdots \\ CX_1 & CX_2 & \ldots & CX_n & \ldots & CX_X \end{pmatrix} \quad (2)$$

$$\begin{pmatrix} B0_1 \\ B0_2 \\ \vdots \\ B0_n \\ \vdots \\ B0_X \end{pmatrix} = C^{-1} \begin{pmatrix} B1_1 \\ B1_2 \\ \vdots \\ B1_n \\ \vdots \\ B1_X \end{pmatrix} \quad (3)$$

$$B1_n = Cn_1 \times B0_1 + Cn_2 \times B0_2 + \ldots + Cn_n \times B0_n + \ldots + Cn_X \times B0_X \quad (4)$$

* * * * *